Feb. 12, 1929.    1,701,726
J. A. MOULD
MECHANISM FOR LUBRICATING INTERNAL COMBUSTION ENGINES
Original Filed Sept. 21. 1922
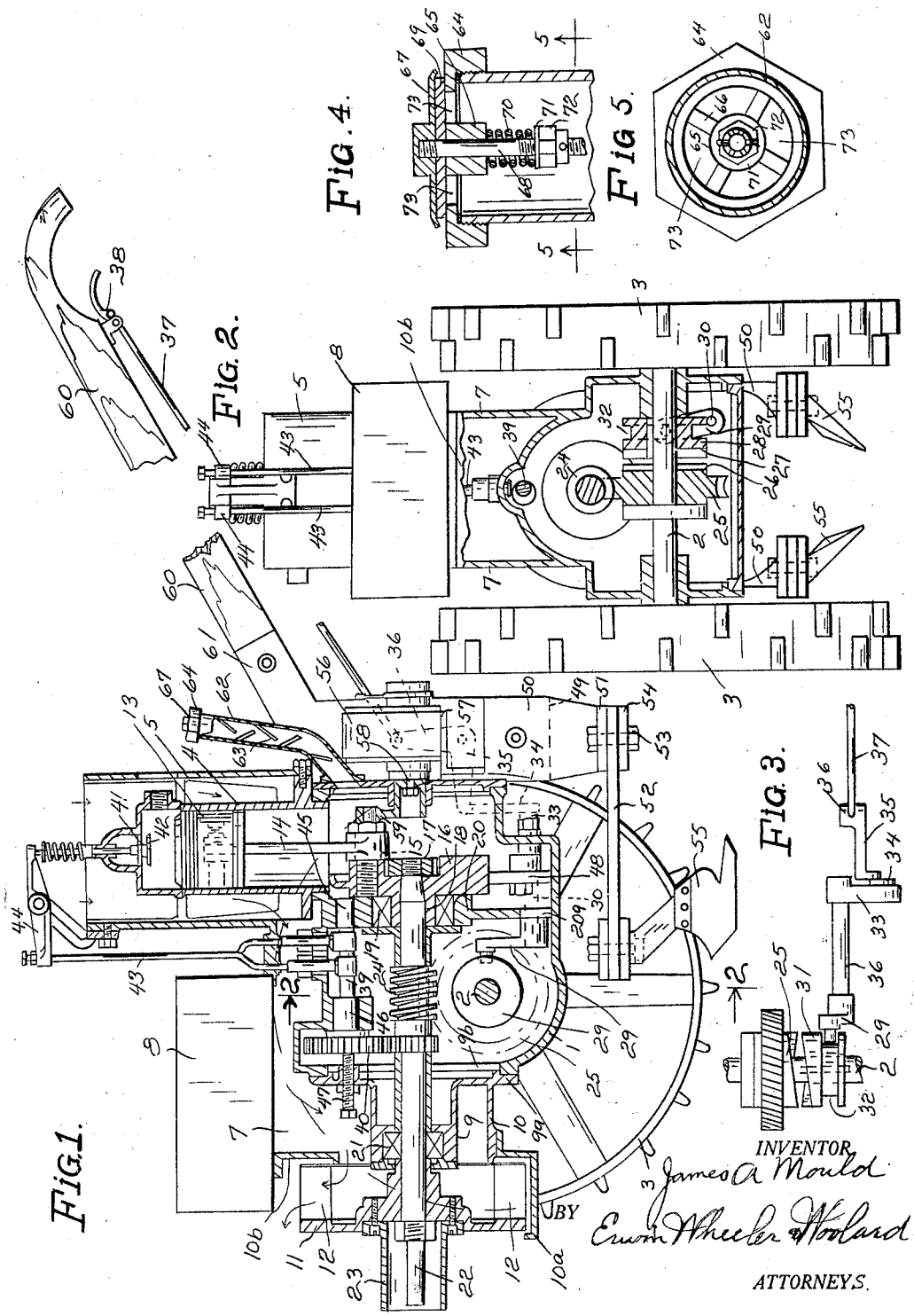
INVENTOR
James A. Mould
BY
Erwin Wheeler Woolard
ATTORNEYS.

Patented Feb. 12, 1929.

1,701,726

UNITED STATES PATENT OFFICE.

JAMES A. MOULD, OF MILWAUKEE, WISCONSIN, ASSIGNOR, BY MESNE ASSIGNMENTS, TO PIONEER MANUFACTURING COMPANY, OF WEST ALLIS, WISCONSIN, A CORPORATION.

MECHANISM FOR LUBRICATING INTERNAL-COMBUSTION ENGINES.

Original application filed September 21, 1922, Serial No. 589,563. Divided and this application filed December 26, 1925. Serial No. 77,855.

This invention relates to improvements in mechanism for lubricating internal combustion engines.

This application is a division of my application for United States Letters Patent for an improvement in power driven cultivators, Serial No. 589,563, filed September 21, 1922, now patent No. 1,578,343.

It is the object of this invention to provide efficient and effective mechanism for lubricating the cylinder, power transmitting elements and bearings of an internal combustion engine, particularly the engine of a power driven, hand guided cultivator.

More specifically it is an object to provide the crank shaft of an internal combustion engine with a circular member revoluble with the shaft and adapted to receive lubricating material upon its periphery whereby such material will be thrown by centrifugal force into the cylinder of the engine.

It is a further object of this invention to so arrange the power transmitting mechanism within the crank case of the engine that certain of the mechanism will pick up lubricating material in the crank case and carry it upwardly to the other of the moving parts, there to be distributed in like manner to other moving parts and to the bearings of such power transmitting mechanism.

A still further object is to provide for the crank case of an internal combustion engine, a breather tube having a valve adapted to permit the passage of air from the crank case and to prevent its return thereto thru such tube, thereby to create a vacuum in the crank case when the piston of the engine is operating, whereby leakage of lubricating oil from the crank case thru any crevices or bearings will be prevented.

In the drawings:

Fig. 1 is a longitudinal vertical sectional view of a cultivator embodying this invention.

Fig. 2 is a fragmentary sectional view of the device taken substantially on the line 2—2 of Fig. 1.

Fig. 3 is a fragmentary view in plan of the control mechanism for the clutch.

Fig. 4 is a vertical section of a portion of the breather pipe showing the valve mechanism.

Fig. 5 is a section taken on the line 5—5 of Fig. 4.

Like parts are identified by the same reference characters throughout the several views.

The body portion of the cultivator comprises a main casing indicated generally by the numeral 1. This casing houses the power transmitting mechanism and associated parts. Preferably journaled in the casing 1 is an axle shaft 2 to which the driving wheels 3 are rigidly secured. Secured to and extending vertically above the rear portion of the main casing 1, is an engine cylinder 4 communicating with the interior of the casing and surrounded by a jacket 5 in spaced relation thereto. This jacket 5 forms an air passage leading downwardly along the engine cylinder and between the walls 7 to the fly wheel 11 which is partially enclosed by the passage walls 10$^a$. The main casing 1 is open at its top between the walls 7 and supports a fuel tank 8 which closes the opening between such walls. A deflector wall 10$^b$ forming a part of the main casing is integral with the walls 7 and depends from the fuel tank 8 and directs air downwardly toward the axis of the fly wheel and around the reduced cylinder portion 9 of the main casing.

The fly wheel 11 is provided with vanes 12 which act as fan blades within the housing 10$^a$ to deliver air upwardly or centrifugally from beneath the fuel tank as indicated by the arrows in Fig. 1, the air being thus drawn by suction downwardly along the engine surfaces and beneath the fuel tank, thereby to cool the engine and warm the fuel tank.

The function of the wall portion 10$^a$ is to prevent the air from being thrown downwardly in a manner to disturb loose particles of earth and develop a dust cloud in advance of the machine. Cooling air, therefore, is drawn from an altitude where it will be comparatively free from dust and directed away from the machine to prevent the forming of dust.

Mounted within the cylinder 4 is a piston 13 connected by means of a pitman 14 to the crank pin 15 which is carried by the counter-weighted crank plate or disk 16. The crank plate or disk 16 is secured to the shaft 17 in any suitable manner and is provided with a reduced forward portion 18 positioned within roller bearing 19 carried by the thickened portion 20 of a transverse web in the main casing 1. This web divides the main casing into a forward and rearward compartment and is apertured at 20ᵃ for placing said compartments in communication.

The forward end of the engine shaft 17 is carried upon roller bearings 21 mounted within the reduced cylinder portion 9 of the main casing. The reduced portion 9 is carried by closure 9ᵃ for closing opening 9ᵇ in the forward end of the main casing 1. As shown in the drawings the bearings 19 and 21 are mounted upon opposite sides of the axle shaft 2 and the engine cylinder 4 and its associated parts are mounted upon the opposite side of the main axle shaft 2 from that upon which the fly wheel is located. The forward portion 22 of the engine shaft 17 may be adapted for detachable connection with a crank and is protected by the sleeve 23 bolted to the forward face of the fly wheel 11.

For operatively connecting the engine shaft 17 and axle shaft 2, a worm 24 is provided upon the engine shaft 17 and meshing with a worm wheel 25 loosely mounted upon the axle shaft 2. This worm wheel 25 is provided with a clutch face 26 adapted to cooperate with a corresponding clutch face 27 upon a clutch member 28 slidably splined upon the axle shaft 2. For controlling the clutch member 28 an arm 29 is provided, secured to a rock shaft 30 and having a pin loosely riding within a groove 32 formed in the clutch member 28. The rear portion of the shaft 30 is provided with an arm 33 extending substantially at right angles to the arm 29. The arm 33 is connected by link 34 to the arm 35 of a bell crank lever, the other arm 36 of the bell crank lever being connected by means of a rod 37 with a hand or finger control lever 38 upon one of the guiding arms 60.

The cam shaft 39 disposed vertically above the engine shaft 17 is driven therefrom by reduced gearing 40 and operates the valves 41 and 42 of the engine thru the rods 43 and levers 44. To facilitate assembling the cam shaft 39 it is preferably provided with a relatively small rear bearing 45 and a relatively large forward bearing 46 thereby permitting the cam shaft to be passed rearwardly to its position. To retain the cam shaft in proper alignment with its bearings a set screw 47 is provided contacting with the forward end of the cam shaft.

The casing for the engine and driving mechanism comprises essentially two main portions, one of which is in communication with the shell or casing 5 and the fan-like fly wheel 11, the other main portion of the casing carrying the driving mechanism and being oil-tight. The lower or oil-tight portion of the casing will be supplied with a quantity of lubricating oil and the worm wheel 25 will be slightly submerged in such oil. The crank plate 16 will, however, be above the level of the oil and therefore a roller 48 has been provided contacting frictionally with the crank plate 16 and disposed in the oil in the casing. Thus when the crank plate is revolving, the roller 48 will carry oil to the crank plate 16 which will in turn throw the oil into the engine cylinder 4. Some of the oil carried to the crank plate 16 by the roller 48 will find its way to the bearing 19 and to the crank pin 15. It will also be noted that the worm wheel 25 will carry oil to the worm 24 and that such oil will move along the engine shaft 17 to the gearing 40 and also work its way over to the bearing 21. Any excess oil upon the larger gearing 40 will work its way over to the bearings of the cam shaft 39. It is obvious that when the cultivator is being used, the oil in the casing will be continually agitated and carried upwardly to the various parts to be lubricated.

The rear portion of the casing 1 is provided with downwardly extending members 49 to which are secured plates 50. The lower portion of the plates 50 are bent at right angles to provide horizontally extending parts 51 which carry forwardly extending arms 52 secured in adjustable position by means of a bolt 53 passing thru the binding washer 54 and suitably clamping the member 52 between such washer and portion 51. At the forward end of the arms 59, cultivator blades 55 are carried adjustable angularly with respect to the bars 52 in a manner similar to that described with reference to the connection between bar 52 and portion 51.

The casing 1 also carries at its rear a magneto 56 supported by a shelf 57 upon the casing and having a shaft 58 in alignment with the engine shaft 17. The end of shaft 58 carries a crank arm 59 which engages the crank pin 15 in any suitable manner such as that disclosed in Fig. 1.

The cultivator may be provided with a pair of guiding arms 60 carried by projections 61 extending from the main casing.

The main casing 1 may be provided with an air breather tube 62 having at its upper end an automatic valve and provided with inner baffles 63. The automatic valve assembly comprises an apertured member 64 provided with a central hub or bearing portion 65 supported from the cap member by webs 66. The valve proper comprises a pressed metal disk 67 secured to the rod 68 slidably journaled in the hub member 65 and a leather disk or gasket 69. The valve is maintained normally in its closed position by means of helical spring 70 which bears at one end against the hub 65 and at the other end against washer 71 maintained upon the rod 68 by nut 72. The leather gasket 69 is of sufficient diameter to close the apertures 73 thru the cap 64.

When the piston 13 of the engine is operating, the downward stroke thereof will tend to compress the air within the casing 1. Such air due to the compressing caused by the piston will escape thru the breather cap 62 by causing the valve thereon to rise from its seat. As soon as the piston moves on its upward stroke it tends to create a vacuum in the casing 1 and therefore the pressure which caused the valve 1 to open will be relieved and the valve permitted to close, thus excluding air exterior to the casing from entry thru the breather tube. As a result, the vacuum created within the casing 1 will prevent lubricating oil therein from escaping thru crevices or bearings. In other words, air exterior of the casing will tend to enter thru such crevices and bearings and draw the oil back into the casing. It can, therefore, be readily seen that while the engine is being operated no lubricating oil will be permitted to escape from the main casing 1. Furthermore, any tendency that the piston may have to permit oil to pass into the combustion chamber will be nullified by reason of the fact that a vacuum is maintained upon the under side of the piston. At the same time, the cylinders will be kept well lubricated by the rotating disk 16 which will throw oil into the cylinder of the engine.

It is obvious from the foregoing description and the drawings that the moving parts of an internal combustion engine have been so arranged as to carry lubricating oil from the oil sump of such engine to the various moving parts by the moving mechanism itself. It is also obvious that an internal combustion engine has been provided with effective means for creating a vacuum within the engine casing whereby the lubricating oils will be prevented from passing thru crevices or bearings in the casing to the exterior thereof.

I claim:

1. In an internal combustion engine having a cylinder and a crank shaft, a circular crank plate secured to said shaft, a crank casing, a rotary wheel positioned in the bottom portion of the crank case and frictionally contacting with the periphery of said crank plate, whereby oil in the crank case may be transferred to the crank plate to be thrown about the interior of the cylinder.

2. In an internal combustion engine having a cylinder and a crank shaft, a crank plate secured to said crank shaft and provided with a bearing surface substantially concentric therewith, a crank case, and an oil delivery device therein comprising a transfer wheel in operative proximity to said surface and adapted for transferring oil from the crank case to the crank plate to be thrown thereby about the interior of said cylinder.

3. In an internal combustion engine, the combination with an engine crank case divided into forward and rearward compartments opening into one another, of a crank shaft journaled in the crank case and extending into the rearward compartment thereof, a crank disk upon said shaft in the rearward compartment, a driving gear upon said shaft in the forward compartment, an axle shaft journaled in the walls of said crank case and disposed transversely of and beneath said crank shaft, a driven gear upon the axle shaft meshing with the driving gear upon the crank shaft, and a lubricating roller disposed beneath said disk and in operative frictional contact therewith, said roller being adapted to transfer to said disk lubricant in the bottom of said crank case, whereby such lubricant may be maintained in the crank case beneath the level of said axle shaft for the operative lubrication of parts in both of said compartments.

4. In an internal combustion engine the combination with an engine crank case adapted to retain lubricant at a comparitively low level, of a crank shaft provided with a crank pin and rotatable above the level of the lubricant in said crank case, a circular bearing surface concentric with the axis of the crank shaft and formed exteriorly of said crank pin, and a transfer roller disposed with a portion normally immersed in lubricant and having another portion in operative frictional bearing contact with said bearing surface.

5. In an internal combustion engine, the combination with an engine crank case adapted to retain lubricant at a given level, of a crank shaft provided with a counterweighted disk revoluble above said level and having a bearing surface concentric with said shaft, a crank pin connected with said disk, and a transfer roller journaled for rotation with a portion immersed in lubricant at said level and with another portion of its periphery in operative bearing contact with the bearing surface of said disk.

6. In an internal combustion engine, the combination with a housing provided with an intermediate transverse web cut away at its lower portion to afford communication therethrough, of a crank shaft journaled in one end of said housing and in said web, an axle shaft journaled in the sides of said housing and extending transversely beneath said crank shaft, gearing operatively connecting said crank shaft and said axle shaft at one side of said web, and a crank member operatively connected with said crank shaft in the other side of said web, whereby said crank and said gearing are lubricated by a single body of lubricant in said housing.

7. In an internal combustion engine, the combination with a housing having an axial opening in one end and an upwardly opening hole adjacent its other end, of a cylinder fitted to said hole and secured to said housing, an intermediate partial wall dividing said housing into compartments and ported to afford communication beneath the lower portion of said compartments, a crank shaft journaled in said wall and provided with a crank in the compartment beneath said cylinder, a closure for the opening in the end of said housing, said crank shaft being journaled in said closure, an axle shaft journaled in said housing transversely of and beneath said crank shaft, gearing connecting the axle shaft and crank shaft in the compartment of said housing other than that in which the crank is disposed, a cam shaft journaled in said housing in the last mentioned compartment thereof, gearing connecting said crank shaft with said cam shaft, clutch mechanism associated with said axle shaft and said gearing and adapted to render said gearing operative or inoperative to drive said axle shaft, and a transfer device for elevating lubricant to said crank shaft in the compartment containing said crank, whereby said crank, crank shaft, cylinder, gearing, cam shaft, and clutch may be lubricated from a single body of lubricant disposed in said housing below the level of said axle shaft.

JAMES A. MOULD.